UNITED STATES PATENT OFFICE.

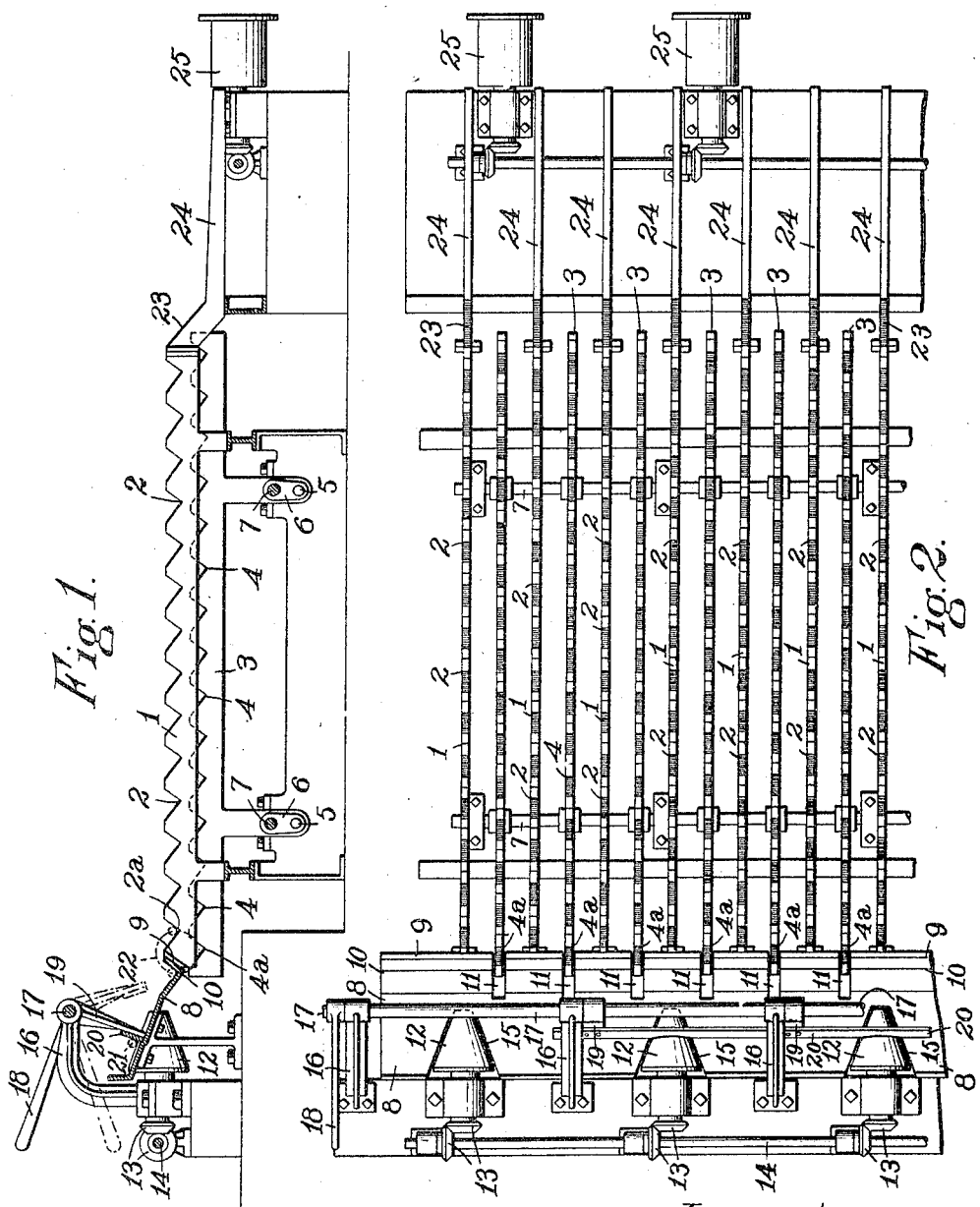

VICTOR E. EDWARDS AND JEROME R. GEORGE, OF WORCESTER, MASSACHUSETTS, ASSIGNORS TO MORGAN CONSTRUCTION COMPANY, OF WORCESTER, MASSACHUSETTS, A CORPORATION OF MASSACHUSETTS.

CONVEYER FOR METAL RODS.

1,031,058.      Specification of Letters Patent.      Patented July 2, 1912.

Application filed July 11, 1910. Serial No. 571,287.

*To all whom it may concern:*

Be it known that we, VICTOR E. EDWARDS and JEROME R. GEORGE, citizens of the United States, residing at Worcester, in the county of Worcester and Commonwealth of Massachusetts, have invented a new and useful Improvement in Conveyers for Metal Rods, of which the following is a specification, accompanied by drawings forming a part of the same.

Our invention relates to that class of conveyers adapted to receive a metal rod from a rolling mill by a longitudinal movement of the rod and to convey the same by a sidewise movement, having means for supporting the rods during said sidewise movement and during the period of cooling. In the present instance we have shown our invention as embodied in a conveyer having a series of stationary supporting bars provided with notches in alinement, in which the heated metal rods are supported and straightened during the process of cooling, and a series of movable notched bars by which the heated metal rods are moved forward by a sidewise step-by-step movement from one line of notches to the next succeeding line.

Our present invention relates to the means for controlling the movement of the heated rods as they are delivered to the mechanism for transferring them by a sidewise step-by-step movement, and our invention consists in the construction and arrangement of parts by which this is accomplished as hereinafter described and pointed out in the annexed claims.

In the accompanying drawings Figure 1 represents a side view of a portion of a conveyer embodying our invention. Fig. 2 is a plan view of that part shown in Fig. 1.

Similar reference characters refer to similar parts in the different figures.

Referring to the accompanying drawings, 1 denotes a series of parallel stationary supporting bars provided with angular notches 2, each set of notches in the bars 1 being arranged in alinement to enable the heated metal rods, as they are moved forward by a step-by-step movement, to rest in the notches 2.

3 denotes a series of parallel movable bars having notches 4. The movable bars 3 are carried upon crank pins 5 in cranks 6, which are attached to rotating shafts 7, 7, so that the bottom of each of the notches 4, 4 will travel through a circular path corresponding to the path of the crank pins 5. At the receiving end of the notched bars 1 we mount a stationary inclined plate 8, having at its lower edge an upturned flange 9 forming an angular trough 10 which is substantially continuous throughout its entire length, being only broken by the notches 11, 11 which provide for the movement of the movable bars 3.

In the supporting framework of the conveyer are journaled conical conveyer rolls 12 in alinement with each other and positively driven through a geared connection 13 from a common driving shaft 14. The conveyer rolls 12 are arranged to receive a rod or bar from a rolling mill by a longitudinal movement across the peripheries of the conveyer rolls. The upper surfaces of the conveyer rolls 12 project slightly through openings 15 in the plate 8, to enable the rod or bar to be longitudinally moved by contact with the rolls. As the rolls 12 are conical, their peripheral speed, and consequently the longitudinal speed of the rods resting thereon, will vary with different planes of rotation.

Mounted above the rolls 12 in brackets 16 is a rocking shaft 17 provided, at any convenient position, with a radial hand lever 18 and also carrying the radial arms 19, to the lower ends of which a plate 20 is preferably attached, capable of a swinging movement over the peripheries of the rolls 12. By rocking the shaft 17 the position of a rod 21 on the rolls can be varied, thereby producing a corresponding variation in the speed of its longitudinal movement. If the rod is supported upon the conical rolls near their larger ends, the longitudinal speed of the rod will be greater than when supported near the smaller ends of the rolls, and any variation in the longitudinal speed may be produced by changing the position of the rod upon the rolls. By depressing the lever handle 18, the shaft 17 may be rocked sufficiently to bring the arms 19 and plate 20 entirely clear of the rolls 12, allowing the rod 21 to roll off the smaller ends of the rolls upon the plate 8 and into the trough 10 in which the rod is supported substantially for its entire length, enabling the heated rod to become straightened by its contact with the walls of the trough 10.

As the rod is delivered from the mill it is received upon that portion of the rolls where the peripheral speed of the rolls approximates the longitudinal speed of the rod as imparted by the last pair of rolls in the mill. When the rod is free from the mill, and before it is delivered to the trough 10, the speed of the rod is retarded by movement toward the smaller ends of the conical rolls so that the momentum will be substantially checked before it comes in contact with the sides of the trough 10. This retardation is accomplished by holding the rod for a period upon the smaller ends of the rolls instead of allowing it to be moved rapidly by gravity over the smaller ends of the rolls and delivered at once into the trough 10.

In the normal position of the arms 19 and plate 20, the latter is held at substantially right angles with the rod supporting surface the arms 19 may be swung toward the trough in which the rod is projected forward and against the sides of which it is pressed by gravity, while in a state of considerable heat, thereby causing it to be straightened by its contact with the plate 8 and plate 20. Immediately behind the free ends of the arms 19, when in their normal position, the plate 8 is slightly depressed to allow the free ends of the arms 19 and lower edge of the plate 20 to project below the plane of the supporting surfaces of the conveyer rolls, so that the arms 19 may be swung toward the trough 10 some distance and still retain the rod upon the smaller ends of the rolls sufficiently long to retard the speed of the rod. The heated rods, when finally delivered from the smaller ends of the conical rolls, are supported their entire length upon the plate, over which they slide sidewise into the right angled trough 10, and are held by gravity against both sides of the trough until they are lifted therefrom by the upward movement of the conveyer bars 3, thereby again tending to straighten the rods.

When the rod is held in the trough 10 and the movable bars 3 are in operation, the first row of notches 4ª in the movable bars will pick up the rod from the trough 10 and deposit it in the first row of notches 2ª in the stationary bars 1. During this movement of the movable bars 3, the bottom of the first row of notches 4ª will travel in the circular path indicated by the broken line 22, Fig. 1, and, at each succeeding movement of the movable bars 3, the rod will be carried step-by-step from one row of notches to the other throughout the entire length of the bars 1 until it is delivered finally upon the incline 23 and allowed to roll across the supporting skids 24 upon conveyer rolls 25.

In the normal position of the stop plate 20 its lower edge extends below the rod supporting surface of the plate 8, which presents a slight shoulder overlapping the lower edge of the stop plate, thereby preventing the entrance beneath the stop plate of any fin or lateral projection which may be present upon the advancing end of the rod.

We claim,

1. In a conveyer for metal rods, the combination with a transferring mechanism for moving the rod sidewise, of a substantially continuous plate having its upper surface inclined from a horizontal plane and having openings, a series of conveyer rolls having their upper surfaces inclined and projecting through said openings in said plate, a trough between said rolls and said transferring mechanism, with said continuous plate extending between the lower ends of said rolls and said trough.

2. In a conveyer for metal rods, the combination with a series of conveyer rolls having their upper surfaces inclined, a stop plate for preventing the sidewise movement of the rods on said rolls by gravity, with the lower edge of said stop plate extending below the plane of the supporting surface of said rolls, and means for moving said stop plate to vary the position of a rod on said rolls.

3. In a conveyer for metal rods, a series of conveyer rolls having their upper surfaces inclined, a rocking shaft journaled above the supporting surfaces of said rolls, radial arms carried by said shaft, a stop plate carried by the free ends of said arms, with its lower edge extending below the rod supporting surface of said rolls, and means for moving said plate toward the lower end of said rolls.

4. In a conveyer for metal rods, a series of conical conveyer rolls having their upper surfaces inclined, a supporting plate between said rolls having an upper rod supporting surface parallel with and slightly below the upper surfaces of said rolls, a stop plate for preventing the sidewise movement of a rod on said rolls by gravity, with the lower edge of said stop plate normally extending below the plane of the supporting surfaces of said rolls.

5. In a conveyer for metal rods, a series of conveyer rolls having their upper surfaces inclined, a plate between said rolls having a surface at the upper ends of said rolls slightly depressed below the rod supporting surfaces of the rolls and having a surface at the lower ends of said rolls still further depressed.

6. In a conveyer for metal rods, a series of conveyer rolls, a rod supporting plate between said rolls having its supporting surface at one end of said conveyer rolls in a higher plane than at the opposite end of said rolls, forming a shoulder extending between said rolls and at right angles with the axes of said rolls, a stop plate for preventing the sidewise movement of said rod during its initial longitudinal movement, said stop plate forming a joint with the shoulder in said rod supporting plate, and means for moving said stop plate away from said shoulder to permit the sidewise movement of the rod.

7. In a conveyer for metal rods, a series of conical conveyer rolls arranged to receive a rod from a rolling mill by a longitudinal movement, and having their upper surfaces inclined from a horizontal plane, retaining means for holding a rod from sidewise movement near the larger ends of said rolls during the initial longitudinal movement of the rod, said retaining means capable of being moved to release said rod from its first position near the larger ends of said rolls and hold it from sidewise movement at the smaller ends of said rolls.

Dated this 28th day of June 1910.

VICTOR E. EDWARDS.
   JEROME R. GEORGE.

Witnesses:
 W. A. WINN,
 M. OLIVE CROSS.